US006796700B2

(12) United States Patent
Kraft

(10) Patent No.: US 6,796,700 B2
(45) Date of Patent: Sep. 28, 2004

(54) FLAT PANEL LUMINAIRE WITH REMOTE LIGHT SOURCE AND HOLLOW LIGHT PIPE FOR BACK LIT SIGNAGE APPLICATIONS

(75) Inventor: Edward Robert Kraft, 1435 First Ave. #2FS, New York, NY (US) 10021

(73) Assignee: Edward Robert Kraft, New York, NY (US)

( * ) Notice: Subject to any disclaimer, the term of this patent is extended or adjusted under 35 U.S.C. 154(b) by 126 days.

(21) Appl. No.: 10/066,006

(22) Filed: Feb. 2, 2002

(65) Prior Publication Data

US 2003/0147256 A1 Aug. 7, 2003

(51) Int. Cl.[7] ............................................. A45D 42/10
(52) U.S. Cl. ........................... 362/560; 362/26; 362/31; 362/551; 362/812; 385/146; 40/546; 40/547
(58) Field of Search ........................... 362/560, 26, 31, 362/551, 812; 40/546, 547; 385/146

(56) References Cited

U.S. PATENT DOCUMENTS

| 4,105,293 A | | 8/1978 | Aizenberg et al. ........... 350/264 |
| 4,422,719 A | | 12/1983 | Orcutt ........................ 350/96.3 |
| 4,435,743 A | * | 3/1984 | Plumly ......................... 362/20 |
| 4,460,940 A | | 7/1984 | Mori ........................... 362/32 |
| 4,471,412 A | | 9/1984 | Mori ........................... 362/32 |
| 4,528,617 A | | 7/1985 | Blackington ................. 362/32 |
| 4,765,701 A | | 8/1988 | Cheslak ...................... 350/96.1 |

(List continued on next page.)

FOREIGN PATENT DOCUMENTS

| EP | 0 534 140 A1 | 3/1993 |
| EP | 0 544 332 A1 | 6/1993 |
| WO | WO 01/51851 | 7/2001 |

OTHER PUBLICATIONS

"Fiber–Optic Panel Throws Light Evenly," Machine Design, Apr. 16, 1998, vol. 70, No. 7, p. 62.

Primary Examiner—Sandra O'Shea
Assistant Examiner—Mark Tsidulko
(74) Attorney, Agent, or Firm—Fish & Neave

(57) ABSTRACT

A unique, solid flat panel lighting emitting luminaire has been created that utilizes a light source remote from the luminaire coupled with a hollow light pipe. The light panel luminaire is fed light flux via a hollow light pipe system into one or two edges of the flat panel. The light panel has imbedded irregular tapered tetrahedron light guides that emit light in a uniform controlled fashion over the length of the emitting surface. The subject lighting luminaire provides light emitted from an adjacent High Intensity Discharge (HID) light source. The luminaire is specifically designed to provide light over a large surface for backlit billboard applications without the limitations of traditional fluorescent light source light boxes. The luminaire does not require any maintenance to its interior as the light source is remote from the emitting surface. The luminaire is one continuous surface without visible seams, that would allow direct attachment of paint or transparency informational signage or simply provide a large surface of homogenous light for a back lit replaceable mediums. The light panel design allows the use of a signal or multiple light sources within a hollow light pipe light concentrator. One or more lamp types such as metal halide and/or high pressure sodium could be combined to deliver a color balanced light flux light source. The longevity and high efficiency of the HID light source light bulbs over fluorescent bulbs is well known. The light source is remote from the light emitting surface and allows any transparent, semi-transparent or semi-opaque material to be installed permanently of temporarily without having to be removed from the light panel emitting surface to facilitate bulb replacement or light box maintenance. The tapered hollow light pipe concentrator efficiently collects light flux and delivers the flux to the edge of the light panel without using glass or plastic fiber optic light guides. Light emitting panel sections can be fabricated and assembled into one homogeneous surface for any usual billboard size.

19 Claims, 3 Drawing Sheets

U.S. PATENT DOCUMENTS

| | | | |
|---|---|---|---|
| 4,822,123 A | 4/1989 | Mori | 350/96.1 |
| 4,843,524 A | 6/1989 | Krent | 362/127 |
| 5,005,108 A | 4/1991 | Pristash et al. | 362/31 |
| 5,050,946 A * | 9/1991 | Hathaway et al. | 385/33 |
| 5,101,325 A | 3/1992 | Davenport et al. | 362/31 |
| 5,136,480 A | 8/1992 | Pristash et al. | 362/31 |
| 5,222,795 A | 6/1993 | Hed | 362/32 |
| 5,671,994 A | 9/1997 | Tai et al. | 362/31 |
| 5,695,583 A | 12/1997 | Van den Bergh et al. | 156/153 |
| 5,836,669 A | 11/1998 | Hed | 362/92 |
| 5,902,033 A * | 5/1999 | Levis et al. | 353/122 |
| 5,997,148 A | 12/1999 | Ohkawa | 362/31 |
| 6,164,791 A | 12/2000 | Gwo-Juh et al. | 362/31 |
| 6,210,013 B1 | 4/2001 | Bousfield | 362/92 |

* cited by examiner

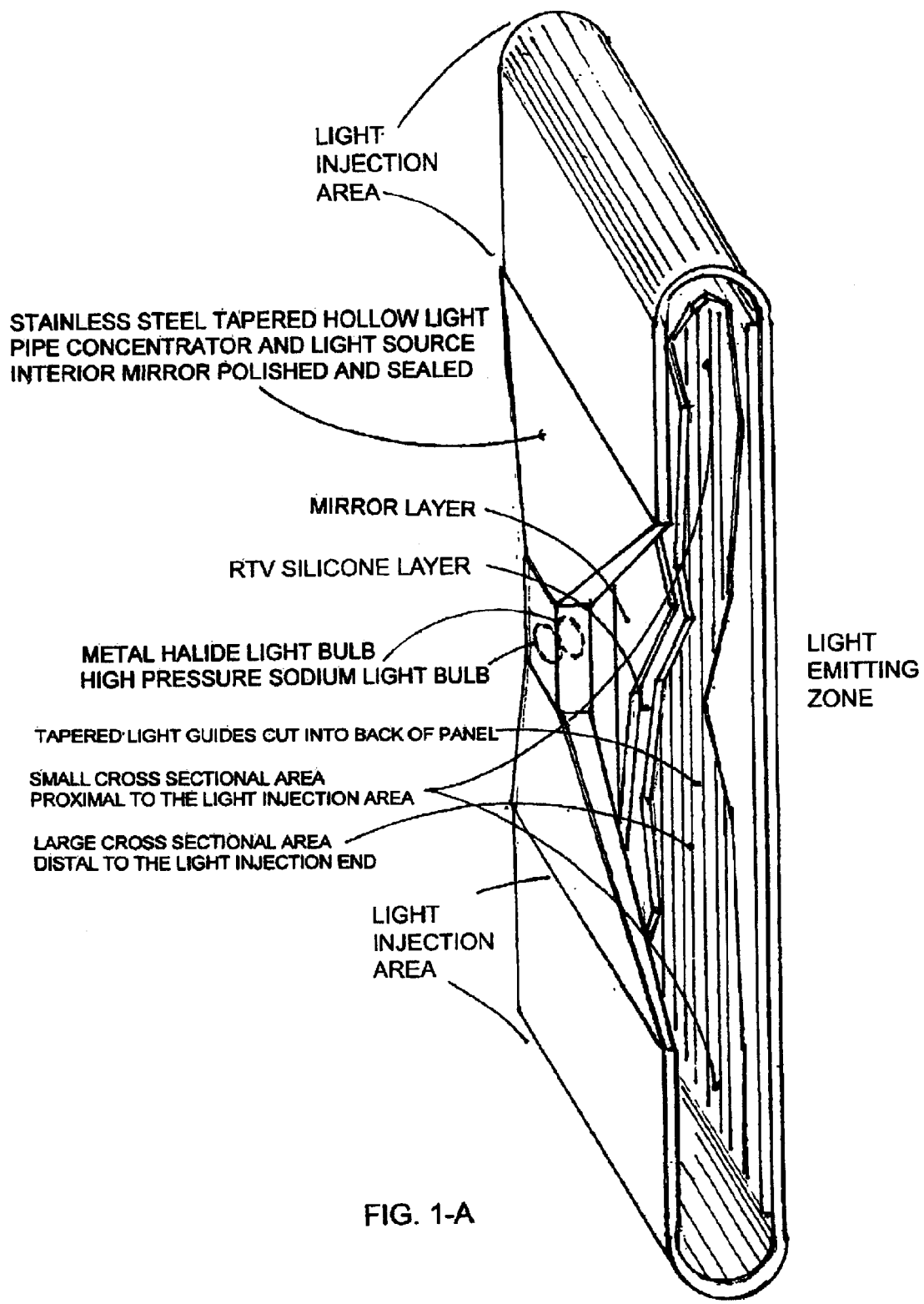
FIG. 1-A

MIRROR LAYER
SMALL CROSS SECTIONAL AREA
FIG. 2-A

RTV SILICONE LAYER
LARGE CROSS SECTIONAL AREA
FIG. 2-B

FLAT PANEL LUMINAIRE WITH REMOTE LIGHT SOURCE AND HOLLOW LIGHT PIPE FOR BACK LIT SIGNAGE APPLICATIONS

STATEMENT REGARDING FEDERALLY SPONSORED RESEARCH AND DEVELOPMENT

The subject invention was not funded in any part by the United States Government. All rights are retained by the inventor for his sole use.

BACKGROUND OF THE INVENTION

Large signage applications for front lit and back lit mediums have several objectionable features. Front lit signage may use high efficiency light sources such as metal halide or high pressure sodium high intensity discharge (HID) lamps so that the light output of these lamps is very efficient. However, in a front lit signage application, luminairs are positioned in a way that causes most of the light to be reflected away from the sign face and cause light pollution. Also HID lamps do not provide a high index of color rendering. Signage medium may have to be color balanced to be visually acceptable under daylight and artificial illumination times.

Traditional light boxes for large billboard size back lit displays eliminate the light pollution problem but have several inherent other limitations. Fluorescent light bulb technology is not the most efficient light source available. Access is required to the light box interior for bulb replacement and ballast replacement limiting the types and properties of illustrative mediums.

A signage system that has a face that can be lit from behind with a color balanced high efficiency light source that would not require the face to be removed for bulb replacement or luminaire maintenance is wanting. Numerous applications of remote light source for illumination are known. In most cases an optical fiber bundle is simply used to conduct the light from a light source to the remote location and the light is emitted from the open end of these fibers. It is desirable to have a large flat panel that emits light in a homogenous method over the entire surface of a flat panel.

A method to extract light from an edge lit flat panel has been the subject of prior patents. In this instance, it is desirable to emit light over the surface of a collection of light guides and extract light evenly along a given length of the guide rather than only at the guide's terminating face. This special need has been recognized in the prior art and numerous approaches to the extraction of light at intervals from optical light guides or optical fibers have been proposed. Each of these proposals, however, has its specific shortcomings making the application impractical or limited to only few situations.

For instance, Orcutt in U.S. Pat. No. 4,422,719, proposes the extraction of light from a light guide by enclosing the wave guide within a transparent sleeve having an index of refraction greater than the index of refraction of the wave guide and embedding within the sleeve light-reflecting powders, or by providing other discontinuities such as cuts or air bubbles within the fiber core. This approach has a number of shortcomings. First, the light extraction rate along the guide declines monotonically (and quite rapidly) from the proximal end to the distal end. The higher index of refraction of the cladding causes conversion of core modes (light propagation mode) to cladding modes to occur at the proximal end or the composite guide, thus sharply depleting the beam intensity as the light traverses the full length of the guide. Furthermore, the use of particles and bubbles suspended within the cladding causes excessive absorption of the light in the transmitting medium (particularly the cladding itself). Orcutt attempts to overcome the lack of light extraction control by including in the core refracting discontinuities or "light extraction" cuts through the cladding to the core and spacing these as a function of the distance from the light source. This approach is difficult to implement and furthermore, creates a series of discrete light sources along the guide and does not allow for continuous light extraction.

Mori (U.S. Pat. Nos. 4,460,940, 4,471,412 and 4,822,123) uses discrete light diffusing elements on a light transmission element to extract light from said light guide. In U.S. Pat. No. 4,460,940, Mori uses convex or concave diffusing elements to extract light of a specific wavelength, and a set of discrete elements with increasing density (but constant thickness) toward the distal end of the transmitting medium to extract light (presumably all wavelengths) from the transmitting element.

In U.S. Pat. Nos. 4,471,412 and 4,822,123, Mori uses discrete light outlets on a light conducting member. In the former patent he uses discrete diffusing elements without consideration to their quantitative light extraction capabilities while in U.S. Pat. No. 4,822,123 he uses light scattering discrete elements and simply increases their number as he approaches the distal end of the light conductor. The disadvantages of Mori's light extraction systems include discontinuity of the light sources in that the appearance of the device includes a plurality of concentrated light sources, and the great difficulty in correctly spacing and sizing the extraction elements to provide for controlled light extraction from the light guide. Furthermore, the manufacturing and assembly of the devices of Mori is awkward and costly.

Cheslek U.S. Pat. No. 4,765,701 also uses discrete elements to extract light from an optical fiber in conjunction with a panel. Cheslek uses angular recesses and does not provide for means to control quantitatively the light extraction, and as a result, the illumination from the downstream (distal) recesses is progressively lower.

Hed U.S. Pat No. 5,222,795 proposed a curve-linear tapering of the cross sectional area of a fiber optic and abrading or painting the flattened surface. Hed in U.S. Pat No. 5,836,669 then proposed the application or elongated triangular reflective stripes onto a plastic plate. The tapering of the fiber optics provided a one way illumination with a substantial amount of light that could not be extracted from the distal end of the tapered fiber perpendicular to the emitting plate face. The tapering of the fiber optics provided a one way illumination with a substantial amount of light that could not be extracted from the distal end of the tapered fiber perpendicular to the emitting plate face. The painted triangle method does not allow enough emitting area to make the light emitted practical for general illumination. The light injection end in both these applications do not provide enough distance for an even light flux and would cause a bright spot at the injection end. This condition on Hed's flat panel application is overcome by making the injection end part of the triangle very narrow and starting the installation of that triangle far from the emitting edge of the panel and thus further limiting the emitting surface.

Bousfeild U.S. Pat. No. 6,210,013, proposes a matrix of dots with increased diameters as they lay distal to the light injecting edge on a flat panel. This method is again limited by the actual area of reflectance The prior art as described is a two dimensional light propagation over a flat panel and thus the light output is limited by the actual area of the reflecting coating or treatment. The Light Emitting Panel herein described uses irregular tapered tetrahedron grooves that have a surface area on at least two sides that is increased as it runs distal from the injection edge of the panel. The amount of light emitted is determined by the surface area and reflectance of the grooves and the treatment of the groove walls.

The prior art is impractical for use as a general illuminating system for task lighting or as an illumination system for large surface emission of light from a flat panel fed from a remote light source for billboard applications.

FIELD OF THE INVENTION

My present invention relates to the efficient generation, collection, concentration and transportation of light flux to a light emitting panel for signage applications. The light emitting panel provides controlled light extraction from light guides cast, imbedded or machined into base plastic or glass panels that are fed light from a remote source. Light is emitted from the panel from the surface of the light guides within the panel. The surface area of the light guides increases as they lay further from the light input end. The interior emitting surface of the light guides are treated to cause light refraction on their surface. Light is either emitted directly from the light guide surface through the face of the panel or from the reflected light from the back of the panel.

A tapered light guide that has the shape and size of the light flux transporting light pipe on one end and the shape and size of the light panel on the other end provides an area where light flux is arranged by total internal reflection to preserve the light flux etendue.

The subject invention was created to replace fluorescent lighting light boxes for back lit signage or applications with a remote light source device to overcome the space requirements, heat production, maintenance requirements, and application limitations of common light boxes for signage.

OBJECTS OF THE INVENTION

A principal object of the invention is to provide a homogeneous light emitting surface for backlight signage without having to access the area directly behind the light emitting surface for maintenance by creating a remote light source situation.

Another object is to provide a means to utilize efficient light sources to provide the light for the light emitting panel by the efficient collection and distribution of light flux from a HID light source and distribute the light evenly over a large light emitting surface.

Another object is to provide a means to blend the output of two or more HID lamp types and balance the color spectrum of the light emitted from the light panel to optimize the light emitting efficiency and emitted color.

Another object of the invention is to provide a method of and means for extracting light from an edge lit panel in a controlled manner so that drawbacks of earlier illuminating systems using other light guides are avoided. The panels are fabricated in sizes to take the place of fluorescent bulb light boxes. Once this method of light extraction was developed, large light sources could be coupled with large light pipes to generate and transport the light flux to a remote location.

Another object is to provide a lighting system where a high efficiency light source can be coupled to one or more light emitting panels without using traditional fiber optic bundles.

Another object is to provide a light pipe system that can transport large amounts of light flux to multiple locations from a single light source. The hollow light pipe is configured in a hexagonal or square prismatic shape that preserves the light source light flux etendue.

Another object is to provide a high efficiency light source that utilizes available high efficiency bulbs to generate light in the most efficient way possible without the limitations and light loss caused by concentration and heat when coupled to plastic light pipes.

It is yet another object of the invented system to provide a light source that may use several different light bulb types to mix the various light outputs of the various bulbs to render the desired color balance without filters or restrictions.

It is a further object of the invented system to utilize readily available high efficiency light bulbs of differing sizes and shapes to be concentrated into an output light flux that has a coherent wave front.

Another object is to provide a means to transport the light flux via a hollow tapered light pipe to concentrate and re-direct the light flux from the light source to the shape of the light panel without the use of fiber optics.

Yet another object is to create a complete remote light source backlit sign that can be configured into common sizes used by the signage industry that is efficient and desirable.

BRIEF DESCRIPTION OF THE DRAWINGS

The above and other objects, features and advantages of the present invention will become more readily apparent from the following description, reference being made to the accompanying drawing in which: connection to a supply light pipe for use in a confined drop ceiling application.

FIG. 1-A is a perspective view from the rear of the panel showing the various reflective layers (RTV Silicone and Mirror) over the tapered light guides cut into the panel. The dual light source is in the center of a highly internally polished stainless steel tapered light pipe.

FIG. 2-A is a simplified lateral cross-sectional view of embedded tetrahedron light guides taken proximate the light-injection area.

FIG. 2-B is a simplified lateral cross-sectional view of embedded tetrahedron light guides taken distal the light-injection area.

DETAILED DESCRIPTION OF THE INVENTION

A remote illumination signage system has been devised that has a light source comprised of one or more light bulbs, an optical hollow tapered light pipe for concentrating and transporting light flux from the light source, a light guide injector that couples the light flux from the transporting hollow light pipe to a light emitting luminaire and a lighting luminaire for delivering light from the light source to a desired region, the luminaire being optically connected to the light source.

The lighting luminaire device was created by casting or machining at least one irregular tapered tetrahedron light guide into a flat rectangular plastic or glass panel such that the surface of the embedded light guide is abraded, etched and/or treated to affect light refraction on the boundary between the base panel material and the embedded light guide. The light guide has a progressively larger cross sectional area as it lays more distal to the light injection edges.

Light flux is injected via an organizational light guide into at least one edge of the light panel and is emitted uniformly across the light panel by at least one elongated embedded tapered light guide having a surface structured with respect to the base panel thereof as to enable transmission of light along the light guide while the periphery prevents substantial emanation of light from the light guide in a direction transverse to said light guide. In addition, a portion of said periphery is modified over an extraction zone of the light guide to impart a generally irregular tapered tetrahedron shape to the zone extending continuously from a small cross-sectional end to a large cross-sectional end thereof. Light traveling through the extraction zone (core) propagates in a direction from the small end to the large end and emanates in a direction transverse to the propagation direction. The zone narrows in width in a spreading direction transverse to said propagation direction and to emanation direction. For example, an area exposed to the light emanating from the light guide is illuminated continuously along the length of the zone. Light is injected into the light guide ahead of the narrow end so that the light propagates in a direction to illuminate the area.

Figure 1:
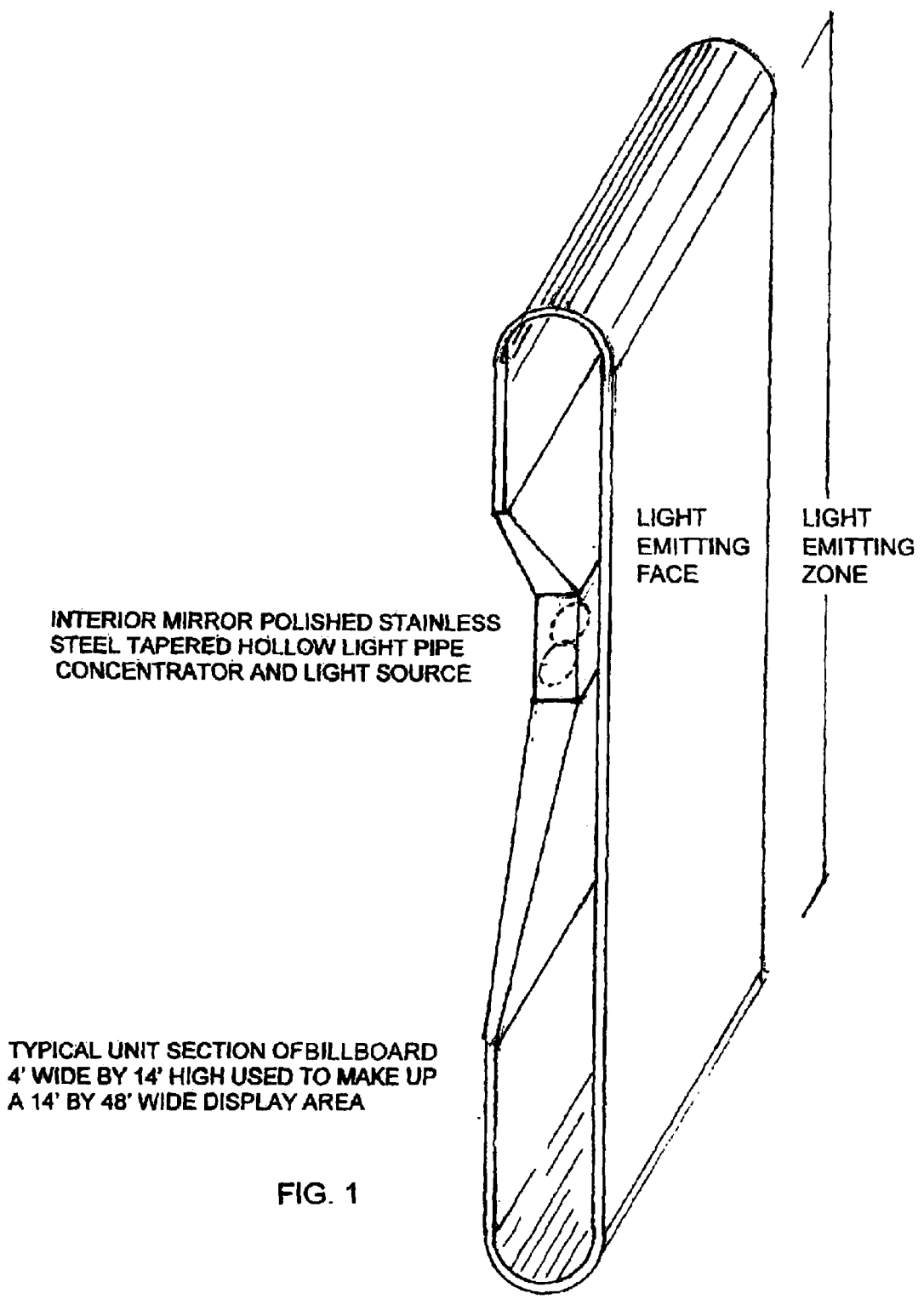
FIG. 1 is a perspective of a typical unit four foot wide by fourteen foot tall section of a larger display. The front emitting view of the back lit signage system showing the light emitting zone.
Figure 2:
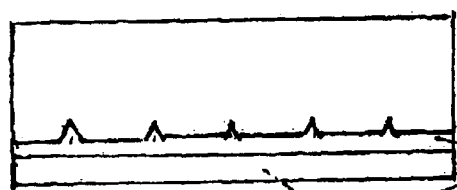
FIG. 2 is a larger cross section of the light guides cut into the light panel with the reflective paint layer applied into the grooves, the RTV Silicone layer and the mirror layer.
Figure 2:
Figure 2:
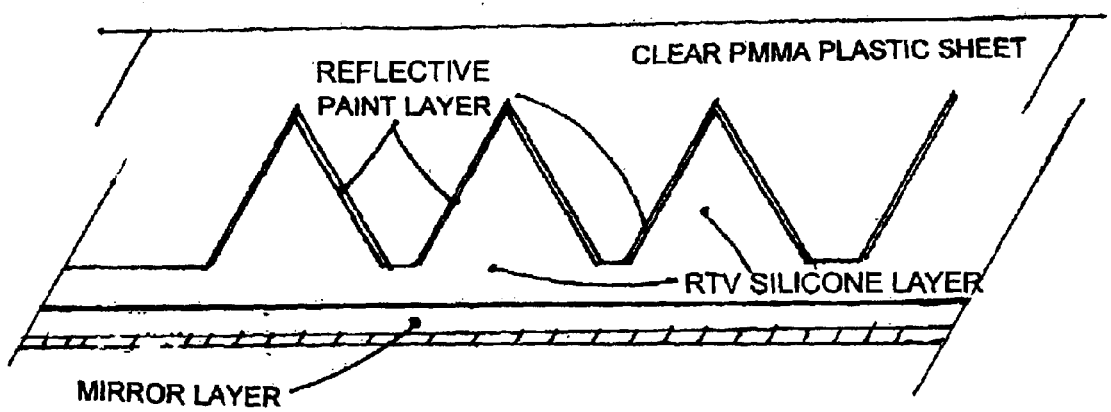
Figure 3:
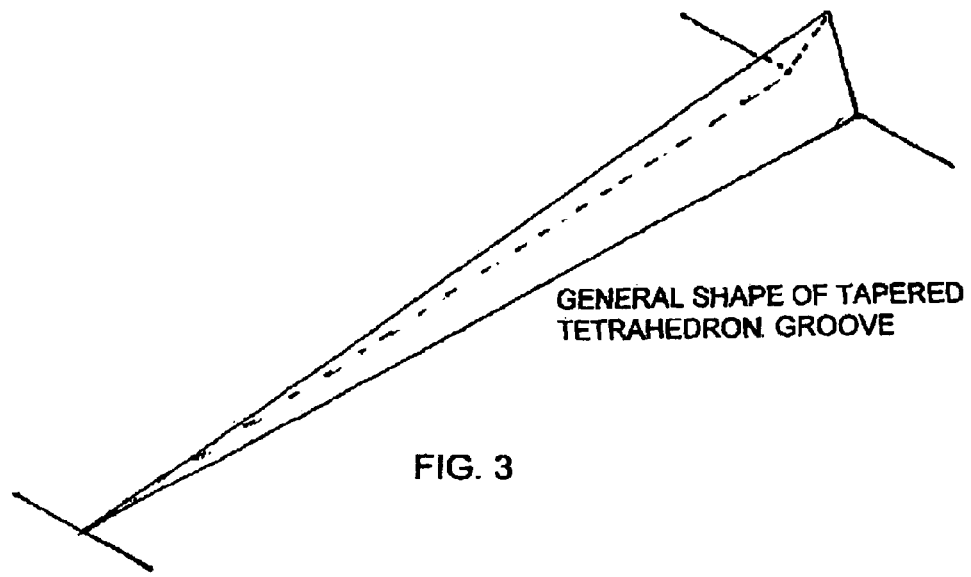
FIG. 3 is a perspective view showing one half of the geometric shape of the light guide within the light panel. As light is fed into both ends in this configuration, the light guides are cross sectionally larger in the center of the panel (distal from both edge inputs) and taper smaller as they lay proximal to the two light injection areas.

FIG. 1 illustrates the invented system in that light can be generated, transported and emitted remotely from the original light source. What is unique to this light source for this particular application is the coupling of two or more different high efficiency lamp types within one light source to balance the light output from the individual lamps to obtain the desired light color and to improve the color rendering of the emitted light from the combination of the lamps. Full spectrum light is desirable in most back lit display applications.

It is well known that that HID lamp types, such as metal halide and high pressure sodium, emit light much more efficiently than fluorescent or incandescent lamps as related to the lumens per watt ratio. It is also widely known that as the wattage of these lamps is increased the efficiency is also increased. HID lamps in general do not emit a balanced light color and are generally not used indoors for general lighting. Metal halide lamps tend to emit light in the cooler, blue ranges, while high pressure sodium lamps emit light in the warmer red-yellow ranges. Manufacturers have coated or filtered the emitted light by treating the outer globe of the lamps or have changed the lamp gas mixture to produce a wider more balanced light spectrum. The filtering and treatment or altering the gas mixture usually produces a more balanced color but reduces the light output efficiency of the lamp.

Two or more lamps with different light color emissions are combined so that the additive nature of light allows the sum total of the light output of the individual lamps to be more balanced across the visible light spectrum without filtering. Two or more unfiltered high efficiency bulbs are selected for their complimentary light output, and combined within a light concentrator light source to generate a full color spectrum of light. The resulting combination of lamps produces a light flux that is generated in the most efficient manner available and color balanced for the most desired effect.

FIG. 1-A shows a tapered hollow internally polished stainless steel tapered light pipe that connects the light source to the light emitting panel. HID lamps are energy efficient but also radiate heat. In traditional remote light source lighting applications, parabolic reflectors concentrate the visible and infrared light output from a lamp to a focal point. The resulting focal point of light energy produces a focused point of heat. This condition limits the use of fiber optic and light pipe materials made of plastic. Additionally, it is widely known within the art of non-imaging optics, that any fiber optic bundle coupled within the focal point of a light source with a parabolic reflector will yield a situation where the center fibers within the bundle receive more light flux energy than the fibers laying outside the focal point of the parabolic reflector. This situation is undesirable when transporting large amounts of light flux.

The tapered hollow stainless steel light pipe yields a light flux that is more evenly distributed across the emitting output end of the tapered light pipe at the input edge of the light panel. The tapered light pipe is of sufficient length to average all the light rays and dissipate the heat from the light bulbs within. The square shape at the output end of the light pipe yields a shape that can be filled with an entire edge of the light panel while maintaining etendue of the light flux from the light source while being transported within the light pipe.

It is widely known that round and many other regular polygon shaped light pipes do not provide an even distribution of light across their emitting faces. The use of a square, quadrilateral, or hexagonal prismatic shaped light pipe yields a very even distribution across the entire emitting face. This effect is desirable to maintain the light flux etendue. The subject light pipe is made of internally polished stainless steel tapered from the light source size to the panel edge size and shape.

FIG. 1-A shows two general areas of the light emitting panel; the light injection guide section and the light emitting zone. Light entering the light guide injection are can be from any light source and can be conducted by any fiber optic or light pipe system; in this instance a square tapered hollow light pipe is used.

Light flux enters the tapered hollow light pipe section directly from the dual light source area and as such is highly organized as a flux rather than a beam. The tapered light guide provides an area where the light flux can be evenly averaged and distributed across the light injection area of the light emitting panel. Once the light flux enters the light emitting area, it encounters areas of refraction and reflection light guides that are cut or cast into the light panel on one side. These refraction/reflection light guides have an increased surface area as they lay more distal to the light flux injection area on two ends.

As the light flux travels parallel to the light refraction/reflection side and the emitting side the refraction/reflection light guide areas disrupt the light flux organization and cause skew rays to be emitted opposite the refraction/reflection side of the light panel. The light flux loses intensity as it travels though the panel and is emitted from the panel. The increased surface area of the refraction/reflection areas compensates for the light intensity loss as it travels through and is emitted from the panel and thus light is emitted uniformly from the panel from the injection ends to the center of the panel which is distal to both injection ends.

Excess light that is not emitted from the panel and travels to the distal perpendicular edge is reflected back into the panel.

It should be obvious to those skilled in the art that in practicing this invention, and designing extraction system with available intensity along the extraction zone, it is preferred to position the zones of lower luminosity closer to the proximal end and the zones of higher luminosity near the distal end of the extraction zone, when the direction of light propagation is from the proximal to the distal end.

While I have described a number of embodiments here, it will be understood that all of the features specific to one embodiment can be used, to the extent compatible, in any other and that the invention also embraces all new and unobvious features individually and in combination within the spirit and scope of the appended claims.

I claim:

1. A device that provides illumination comprising:
   a remote light source;
   at least one transporting light pipe having two ends, one said end coupled to said light source; and
   at least one light-emitting panel coupled to the other said end of said light pipe, said light-emitting panel comprising:
      a light-injection guide,
      a light-emitting zone having a proximal end and a distal end, said proximal end joined to said light-injection guide, and
      at least one irregular tetrahedrally-shaped light guide embedded in said light-emitting zone, said light guide extending continuously from said proximal end to said distal end and forming a groove that increases in surface area from said proximal end to said distal end;
   wherein said light-injection guide has an edge that is perpendicular to said proximal end of said light-emitting zone.

2. The device according to claim 1 wherein said transporting light pipe is bent over a radius of 10 times one-half its thickness.

3. The device according to claim 1 further comprising two transporting light pipes.

4. The device according to claim 3 further comprising one light-emitting zone that connects said two light pipes such that the proximal end of the light-emitting zone for one said light pipe is the distal end of the light-emitting zone for other said light pipe.

5. The device according to claim 1 wherein said light source is a high intensity discharge (HID) lamp.

6. The device according to claim 5 wherein said HID lamp comprises a metal halide or a high pressure sodium lamp.

7. The device according to claim 1 wherein said light source is a light concentrator light source that combines light emitted from two or more HID lamps.

8. The device according to claim 7 wherein said light emitted from two or more HID lamps is unfiltered.

9. The device according to claim 1 wherein said transporting light pipe is hollow.

10. The device according to claim 9 wherein said transporting light pipe is stainless steel.

11. The device according to claim 10 wherein said transporting light pipe has an internal surface that is polished.

12. The device according to claim 1 wherein said transporting light pipe end coupled to said light source is tapered to the size of said light source.

13. The device according to claim 1 wherein said transporting light pipe has a prismatic shape that is hexagonal, square, or quadrilateral.

14. The device according to claim 1 comprising multiple irregular tetrahedrally-shaped light guides embedded in said light-emitting zone, said multiple light guides arranged in parallel with respect to each other.

15. The device according to claim 1 wherein said light-emitting zone comprises a mirror layer, a silicone layer, and a base layer, said mirror layer interfacing said silicone layer and said silicone layer interfacing said base layer, said light guide being cast or machine, into said base layer.

16. The device according to claim 15 wherein said base layer comprises plastic or glass.

17. The device according to claim 1 wherein said light guide has two interior surfaces treated with a reflective material.

18. The device according to claim 17 wherein said reflective material is a highly reflective paint.

19. The device according to claim 1 wherein said light guide has a surface that is abraded, etched, chemically treated, silk screened, or laminated.

* * * * *